US005789484A

United States Patent [19]
Kan et al.

[11] Patent Number: 5,789,484
[45] Date of Patent: Aug. 4, 1998

[54] 4-METHYL-1-PENTENE POLYMER COMPOSITIONS

[75] Inventors: Kojiro Kan; Akio Yamamoto, both of Yamaguchi, Japan

[73] Assignee: Mitsui Petrochemical Industries, Ltd., Tokyo, Japan

[21] Appl. No.: 642,890

[22] Filed: May 6, 1996

[30] Foreign Application Priority Data

May 26, 1995 [JP] Japan .................... 7-128228
Apr. 4, 1996 [JP] Japan .................... 8-082698

[51] Int. Cl.$^6$ .................... C08L 23/10; C08L 53/02
[52] U.S. Cl. .................... 525/98; 525/95; 525/240
[58] Field of Search .................... 525/240, 95, 98

[56] References Cited

U.S. PATENT DOCUMENTS 4,079,099  3/1978  Gergen et al. .................... 525/98
4,546,150 10/1985  Shigemoto .................... 525/240
4,894,417  1/1990  Holden .................... 525/98
4,988,558  1/1991  Shigemoto .................... 428/213
5,025,057  6/1991  Shigemoto .................... 524/432
5,382,620  1/1995  Nagase et al. .................... 524/491

FOREIGN PATENT DOCUMENTS 60-28442  2/1985  Japan .

*Primary Examiner*—Joseph L. Schofer
*Attorney, Agent, or Firm*—Birch, Stewart, Kolasch & Birch, LLP

[57] ABSTRACT

A 4-methyl-1-pentene polymer composition is prepared by melt mixing (A) a 4-methyl-1-pentene polymer, (B) a 1-butene polymer, (C) a propylene polymer, and (D) a triblock copolymer of polystyrene/ethylene-butylene copolymer/polystyrene and/or a triblock copolymer of polystyrene/ethylene-propylene copolymer/polystyrene. The composition has improved gas permeability, flexibility, and mechanical properties and is formed into a film which is heat sealable.

17 Claims, No Drawings

4-METHYL-1-PENTENE POLYMER COMPOSITIONS

BACKGROUND OF THE INVENTION

1. Field of the Invention

This invention relates to a 4-methyl-1-pentene polymer composition and more particularly, to a 4-methyl-1-pentene polymer composition having improved heat sealability, flexibility and gas permeability.

2. Description of the Related Art

Because of characteristic features including a melting point of 220° to 240° C., a high heat distortion temperature, and high gas permeability, 4-methyl-1-pentene polymer compositions have been utilized in a variety of applications.

For the manufacture of medical and biological bags for containing platelets and cells, vinyl chloride base materials are currently used. Since the vinyl chloride base materials, however, are less gas permeable, platelets and cells can be stored in the bags for only a limited time. Higher gas permeability materials are thus desired for the manufacture of platelet and cell-storing bags.

On the other hand, 4-methyl-1-pentene polymers have high gas permeability, but their mechanical properties and flexibility are low and their film is poorly heat sealable. Thus bags formed from 4-methyl-1-pentene polymer film by heat sealing lack stability. It is generally well known that the addition of ethylene resins such as low-density polyethylene and ethylene-propylene copolymers is effective for improving heat sealing properties. However, addition of ethylene resins to 4-methyl-1-pentene polymers little improves heat sealing properties and rather detracts from impact resistance due to poor dispersion.

For improving the heat sealing properties of 4-methyl-1-pentene polymer film, it was proposed in Japanese Patent Application Kokai (JP-A) No. 28442/1985 to blend a specific propylene-α-olefin copolymer in a 4-methyl-1-pentene polymer. However, films formed from a blend of a 4-methyl-1-pentene polymer and a specific propylene-α-olefin copolymer are still unsatisfactory in heat seal strength and little improved in mechanical properties. Therefore, there is a desire to have a 4-methyl-1-pentene polymer composition which is improved in heat sealing and mechanical properties while maintaining the advantageous features of 4-methyl-1-pentene polymers.

SUMMARY OF THE INVENTION

An object of the invention is to provide a 4-methyl-1-pentene polymer composition which is improved in gas permeability, flexibility, mechanical properties, and heat sealability.

We made investigations to improve the heat sealing, flexibility and mechanical properties of 4-methyl-1-pentene polymers while taking advantage of their own superior gas permeability. As a result, we have found that when a 4-methyl-1-pentene polymer is blended with a 1-butene polymer, a propylene polymer, and a triblock copolymer of polystyrene/ethylene-butylene copolymer/polystyrene or a triblock copolymer of polystyrene/ethylene-propylene copolymer/polystyrene, there is obtained a composition which is significantly improved in flexibility, heat sealing and mechanical properties while maintaining high gas permeability.

More specifically, the present invention provides a 4-methyl-1-pentene polymer composition comprising (A) 20 to 80 parts by weight of a 4-methyl-1-pentene polymer, (B) 80 to 20 parts by weight of a 1-butene polymer, the amount of (A) and (B) combined being 100 parts by weight, (C) 10 to 150 parts by weight of a propylene polymer, and (D) 50 to 200 parts by weight of a triblock copolymer of polystyrene/ethylene-butylene copolymer/polystyrene and/or a triblock copolymer of polystyrene/ethylene-propylene copolymer/polystyrene. The composition is prepared by mixing these components in a molten state.

DETAILED DESCRIPTION OF THE INVENTION

The 4-methyl-1-pentene polymer composition of the invention, which is often referred to as an inventive composition, is described in detail.

Component (A) of the inventive composition is a 4-methyl-1-pentene polymer which may be either a 4-methyl-1-pentene homopolymer or a random copolymer of 4-methyl-1-pentene with another α-olefin. Examples of the other α-olefin include those α-olefins having 2 to 20 carbon atoms such as ethylene, propylene, 1-butene, 1-hexene, 1-octene, 1-decene, 1-dodecene, 1-tetradecene, 1-hexadecene, 1-octadecene, and 1-eicosene. Preferred α-olefins are 1-decene, 1-dodecene, 1-tetradecene, 1-hexadecene, 1-octadecene, and 1-eicosene. Where the 4-methyl-1-pentene polymer is a copolymer, the α-olefins may be contained alone or in admixture of two or more.

The 4-methyl-1-pentene polymer (A) should preferably be a 4-methyl-1-pentene based polymer containing at least 80% by weight of 4-methyl-1-pentene. It is preferred that the content of other α-olefin in the 4-methyl-1-pentene polymer is 0.1 to less than 20% by weight because compositions having improved heat resistance are obtained.

The 4-methyl-1-pentene polymer (A) should preferably have a melt flow rate (MFR) of 0.1 to 150 g/10 min., especially 1.0 to 100 g/10 min. as measured at a temperature of 260° C. and a load of 5.0 kg according to ASTM D1238. Compositions containing 4-methyl-1-pentene polymers with a melt flow rate of at least 0.1 g/10 min. are improved in flow and thus easier to mold whereas compositions containing 4-methyl-1-pentene polymers with a melt flow rate of up to 150 g/10 min. are further improved in heat sealing and impact resistance.

Component (B) of the inventive composition is a 1-butene polymer which may be either a 1-butene homopolymer or a random copolymer of 1-butene with another α-olefin. Examples of the other α-olefin include those α-olefins having 2 to 20 carbon atoms such as ethylene, propylene, 1-hexene, 1-octene, 1-decene, 1-tetradecene, and 1-octadecene. Preferred α-olefins are ethylene and propylene. Where the 1-butene polymer is a copolymer, the α-olefins may be contained alone or in admixture of two or more.

The 1-butene polymer (B) should preferably be a 1-butene based polymer containing at least 60% by weight of 1-butene. It is preferred that the content of other α-olefin in the 1-butene polymer is less than 40% by weight, especially less than 25% by weight when the compatibility of 1-butene polymer (B) with 4-methyl-1-pentene polymer (A) is taken into account.

The 1-butene polymer (B) should preferably have a melt flow rate (MFR) of 0.01 to 100 g/10 min., especially 0.1 to 50 g/10 min. as measured at a temperature of 190° C. and a load of 2.16 kg according to ASTM D1238. With a melt flow rate of at least 0.01 g/10 min., 1-butene polymers are improved in flow and thus more uniformly dispersible. Compositions containing 1-butene polymers with a melt flow rate of up to 100 g/10 min. are further improved in heat sealing and impact resistance.

Component (C) of the inventive composition is a propylene polymer which may be either a propylene homopolymer or a random copolymer of propylene with another $\alpha$-olefin. Examples of the other $\alpha$-olefin include those $\alpha$-olefins having 2 to 20 carbon atoms such as ethylene, 1-butene, 1-hexene, 1-octene, 1-decene, 1-tetradecene, and 1-octadecene. Preferred $\alpha$-olefins are ethylene and 1-butene. Where the propylene polymer is a copolymer, the $\alpha$-olefins may be contained alone or in admixture of two or more.

The propylene polymer (C) should preferably be a propylene based polymer containing at least 60% by weight of propylene. It is preferred that the content of other $\alpha$-olefin in the propylene polymer is 0 to 40% by weight, especially 5 to 30% by weight because the inventive compositions are further improved in heat sealing and mechanical properties such as tensile strength.

The propylene polymer (C) should preferably have a melt flow rate (MFR) of 0.01 to 100 g/10 min., especially 0.1 to 50 g/10 min. as measured at a temperature of 230° C. and a load of 2.16 kg according to ASTM D1238. Propylene polymers with a melt flow rate of at least 0.01 g/10 min. are more uniformly dispersible with 4-methyl-1-pentene polymer (A) whereas compositions containing propylene polymers with a melt flow rate of up to 100 g/10 min. are further improved in heat sealing and impact resistance.

Component (D) of the inventive composition is a triblock copolymer of polystyrene/ethylene-butylene copolymer/polystyrene (abbreviated as SEBS, hereinafter) and/or a triblock copolymer of polystyrene/ethylenepropylene copolymer/polystyrene (abbreviated as SEPS, hereinafter). The inventive composition may contain either one or both of SEBS and SEPS as component (D).

The SEBS used as component (D) is a triblock copolymer having in a molecule a block unit A consisting of an ethylene-butylene copolymer and at least one block unit B derived from styrene at either end of block unit A.

The SEBS preferably has a weight ratio of styrene to rubber component in the range of from 10/90 to 60/40, especially from 10/90 to 40/60 because in this range, SEBS performs satisfactorily as rubber and compositions having improved heat sealing and impact resistance are obtainable. The term "rubber component" in SEBS designates the block unit A derived from an ethylene-butylene copolymer.

The SEBS should preferably have a melt flow rate (MFR) of 0.01 to 100 g/10 min., especially 0.1 to 50 g/10 min. as measured at a temperature of 230° C. and a load of 2.16 kg according to ASTM D1238.

The SEBS may be graft modified with various monomers insofar as its basic characteristics are not significantly altered. The monomers used herein are maleic anhydride, maleic acid, and glycidyl methacrylate, for example.

Commercially available examples of the SEBS include Kraton G1650, Kraton G1652, Kraton G1657, Kraton G1726X, and Kraton FG1901X from Shell Chemical K.K. and Tuftec H1052, H1041, H1051, M1913, and M1943 from Asahi Chemicals K.K., with Kraton G1657 and Tuftec H1052 being especially preferred. Other commercially available products of SEBS are, of course, useful insofar as the above-mentioned requirements are met.

The SEPS used as component (D) is a triblock copolymer having in a molecule a block unit A consisting of an ethylene-propylene copolymer and at least one block unit B derived from styrene at either end of block unit A.

The SEPS preferably has a weight ratio of styrene to rubber component in the range of from 10/90 to 60/40, especially from 10/90 to 40/60 because in this range, SEPS performs satisfactorily as rubber and compositions having improved heat sealing and impact resistance are obtainable. The term "rubber component" in SEPS designates the block unit A derived from an ethylene-propylene copolymer.

The SEPS should preferably have a melt flow rate (MFR) of 0.01 to 100 g/10 min., especially 0.1 to 50 g/10 min. as measured at a temperature of 200° C. and a load of 10 kg according to JIS K-7210.

The SEPS may be graft modified with various monomers insofar as its basic characteristics are not significantly altered. The monomers used herein are maleic anhydride, maleic acid, and glycidyl methacrylate, for example. Commercially available examples of the SEPS include Septon 2003, Septon 2023, Septon 2043, Septon 2063, Septon 2005, Septon 2006 and Septon 2007 from Kurare K.K., with Septon 2023 and 2043 being especially preferred. Other commercially available products of SEPS are, of course, useful insofar as the above-mentioned requirements are met.

In the inventive composition, 4-methyl-1-pentene polymer (A) is preferably blended with 1-butene polymer (B) such that there are 20 to 80 parts by weight of (A) and 80 to 20 parts by weight of (B), more preferably 30 to 70 parts by weight of (A) and 70 to 30 parts by weight of (B), most preferably 40 to 60 parts by weight of (A) and 60 to 40 parts by weight of (B). Within this blending ratio range, the composition will maintain improved heat resistance and gas permeability inherent to the 4-methyl-1-pentene polymer and 4-methyl-1-pentene (A) and propylene polymer (C) are well dispersible with each other in the composition.

With respect to the amount of propylene polymer (C), the inventive composition preferably contains 10 to 150 parts by weight, more preferably 30 to 120 parts by weight, most preferably 40 to 100 parts by weight of (C) relative 20 to 100 parts by weight of (A) and (B) combined. Within this blending ratio range, compositions having improved heat sealing and mechanical properties are obtained.

With respect to the amount of SEBS and/or SEPS (D), the inventive composition preferably contains 50 to 200 parts by weight, more preferably 60 to 150 parts by weight, most preferably 70 to 120 parts by weight of (D) relative to 100 parts by weight of (A) and (B) combined. Within this blending ratio range, SEBS and SEPS fully exert their rubber performance and compositions having improved heat sealing, flexibility, gas permeability and heat resistance are obtained.

In the inventive composition, various additives commonly blended in polyolefins may be added insofar as the object of the invention is not impaired. Exemplary additives are silane coupling agents, weathering stabilizers, heat resistance stabilizers, slip agents, nucleating agents, pigments and dyes.

Preferably, the inventive composition has a melt flow rate (MFR) of 0.1 to 150 g/10 min., more preferably 1.0 to 100 g/10 min. as measured at a temperature of 260° C. and a load of 5.0 kg according to ASTM D1238. Compositions with MFR of at least 0.1 g/10 min. are improved in flow and thus easier to mold whereas compositions with MFR of up to 150 g/10 min. are improved in heat sealing and mechanical properties such as impact resistance.

The inventive composition is prepared by blending 4-methyl-1-pentene polymer (A), 1-butene polymer (B), propylene polymer (C), SEBS and/or SEPS (D) and optionally, various additives in a predetermined proportion by any well-known method using a V blender, ribbon blender, Henschel mixer or tumbler blender and then melt mixing them in a single or twin screw extruder, kneader or Banbury mixer, followed by granulation or pulverization. Melt mixing is carried out while the mixture is heated to a temperature of 260° to 320° C., preferably 270° to 310° C.

Since the 4-methyl-1-pentene polymer compositions of the invention have improved heat resistance, heat sealability, mechanical properties such as impact resistance, and gas permeability, they are useful in preparing medical and food films which are required to be highly gas permeable.

The compositions can be formed into various types of film by extrusion molding and are thus advantageously used in the manufacture of platelet and cell-storing bags which are desired to be readily heat sealable and have improved flexibility and mechanical properties.

EXAMPLE

Examples of the invention are given below by way of illustration and not by way of limitation. All parts are by weight.

In the following Examples and Comparative Examples, films were examined for physical properties including MFR, tensile properties, heat sealability, and gas permeability by the following tests.

(1) Melt flow rate (MFR)

A film was measured for melt flow rate at a temperature of 260° C. and a load of 5 kg according to ASTM D1238.

(2) Tensile properties

A specimen cut from a film was examined by a tensile test under the following conditions.

Specimen shape: ASTM type IV
Pulling rate: 200 mm/min.
Chuck span: 64 mm
Temperature: 23° C.
Test number (n): 5

(3) Heat A sealability

A pair of films were laid one on another and heat sealed under the following conditions using heat bars.

| Heat sealing conditions | | |
|---|---|---|
| Seal bar temperature | | Heat sealing |
| Upper seal bar | Lower seal bar | time |
| 280° C. | 140° C. | 4 sec. |
| 285° C. | 140° C. | 4 sec. |
| 290° C. | 140° C. | 4 sec. |

Thereafter, a T-peel test was carried out on the heat seal under the following conditions.

Peel test conditions
Peeling rate: 300 mm/min.
Chuck span: 64 mm
Temperature: 23° C.
Test number (n): 5

(4) Gas permeability

A film was measured for a coefficient of oxygen permeation according to JIS K7126 except that 1/10 of its area was masked and a gas having an oxygen concentration of 4.95% was used.

Example 1

A blend was prepared by mixing the following components at a high speed for 1 minute in a Henschel mixer. The components blended were 50 parts of a 4-methyl-1-pentene/1-octadecene random copolymer powder (1-octadecene content: 6.0% by weight, MFR: 5.0 g/10 min.), 50 parts of a 1-butene polymer (ethylene content: 5% by weight, MFR: 1.0 g/10 min.), 50 parts of a propylene polymer (1-butene content: 20% by weight, MFR: 5.7 g/10 min.), and 75 parts of a SEBS (Kraton G1657 by Shell Chemical K.K., styrene content: 13% by weight, MFR: 8.0 g/10 min.).

Also included as stabilizers were 0.10 part of 2-[1-(2-hydroxy-3,5-di-tert-pentylphenyl)ethyl]-4,6-di-tert-pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta-(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.). The blend was admitted into a twin-screw extruder (set temperature 280° C., diameter 65 mm) where it was melted and milled at 280° C. to form a composition. The composition was extruded through the T-die (set temperature 280° C.) and cooled with shaping rolls at 60° C., obtaining a film with a gage of 250 μm. The film was tested for MFR, tensile properties, heat sealability, and gas permeability, with the results shown in Tables 1 and 2.

Example 2

A blend was prepared by mixing the following components at a high speed for 1 minute in a Henschel mixer. The components blended were 66.7 parts of a 4-methyl-1-pentene/1-octadecene random copolymer powder (1-octadecene content: 6.0% by weight, MFR: 5.0 g/10 min.), 33.3 parts of a 1-butene polymer (ethylene content: 5% by weight, MFR: 1.0 g/10 min.), 100 parts of a propylene polymer (1-butene content: 20% by weight, MFR: 5.7 g/10 min.), and 100 parts of a SEBS (Kraton G1657 by Shell Chemical K.K., styrene content: 13% by weight, MFR: 8.0 g/10 min.).

Also included as stabilizers were 0.10 part of 2-[1-(2-hydroxy-3,5-di-tert-pentylphenyl)ethyl]-4,6-di-tert pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta-(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.). As in Example 1, a composition was prepared from the blend and formed into a film with a gage of 250 μm. The film was tested for MFR, tensile properties, heat sealability, and gas permeability, with the results shown in Tables 1 and 2.

Example 3

A blend was prepared by mixing the following components at a high speed for 1 minute in a Henschel mixer. The components blended were 50 parts of a 4-methyl-1-pentene/1-octadecene random copolymer powder (1-octadecene content: 6.0% by weight, MFR: 5.0 g/10 min.), 50 parts of a 1-butene polymer (ethylene content: 5% by weight, MFR: 1.0 g/10 min.), 50 parts of a propylene polymer (1-butene content: 20% by weight, MFR: 5.7 g/10 min.), and 75 parts of a SEPS (Septon 2043 by Kurare K.K., styrene content: 13% by weight, MFR: 13 g/10 min.).

Also included as stabilizers were 0.10 part of 2-[1-(2-hydroxy-3,5-di-tert-pentylphenyl)ethyl]-4,6-di-tert pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta-(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.). As in Example 1, a composition was prepared from the blend and formed into a film with a gage of 250 μm. The film was tested for MFR, tensile properties, heat sealability, and gas permeability, with the results shown in Tables 1 and 2.

Example 4

A blend was prepared by mixing the following components at a high speed for 1 minute in a Henschel mixer. The components blended were 40 parts of a 4-methyl-1-pentene/1-octadecene random copolymer powder (1-octadecene content: 6.0% by weight, MFR: 5.0 g/10 min.), 60 parts of a 1-butene polymer (ethylene content: 5% by weight, MFR: 1.0 g/10 min.), 60 parts of a propylene polymer (1-butene content: 20% by weight, MFR: 5.7 g/10 min.), and 100 parts of a SEBS (Kraton G1657 by Shell Chemical K.K., styrene content: 13% by weight, MFR: 8.0 g/10 min.).

Also included as stabilizers were 0.10 part of 2-[1-(2-hydroxy-3,5-di-tert-pentylphenyl)ethyl]-4,6-di-tert pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta-(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.). As in Example 1, a composition was prepared from the blend and formed into a film with a gage of 250 μm. The film was tested for MFR, tensile properties, heat sealability, and gas permeability, with the results shown in Tables 1 and 2.

Comparative Example 1

A blend was prepared by mixing 100 parts of a 4-methyl-1-pentene/1-octadecene copolymer powder (1-octadecene content: 6.0% by weight, MFR: 5.0 g/10 min.) with stabilizers: 0.10 part of 2-[1-(2-hydroxy-3,5-di-tert-pentylphenyl)ethyl]-4,6-di-tert-pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.) at a high speed for 1 minute in a Henschel mixer. As in Example 1, a composition was prepared from the blend and formed into a film with a gage of 250 μm. The film was tested for MFR, tensile properties, heat sealability, and gas permeability, with the results shown in Tables 1 and 2.

Comparative Example 2

A blend was prepared by mixing the following components at a high speed for 1 minute in a Henschel mixer. The components blended were 50 parts of a 4-methyl-1-pentene/1-octadecene copolymer powder (1-octadecene content: 6.0% by weight, MFR: 5.0 g/10 min.), 50 parts of a 1-butene polymer (ethylene content: 5% by weight, MFR: 1.0 g/10 min.), and 50 parts of a propylene polymer (1-butene content: 20% by weight, MFR: 5.7 g/10 min.).

Also included as stabilizers were 0.10 part of 2-[1-(2-hydroxy-3,5-di-tert-pentylphenyl)ethyl]-4,6-di-tert pentylphenyl acrylate (tradename Sumilizer GS by Sumitomo Chemical K.K.), 0.10 part of tetrakis[methylene-3(3,5-di-tert-butyl-4-hydroxyphenyl)propionate]methane (tradename Irganox 1010 by Ciba Geigy K.K.), 0.10 part of penta-(erythritol-tetra-β-mercaptolauryl) propionate (tradename Seenox 412S by Shipro Kasei K.K.), and 0.03 part of calcium stearate (tradename Calcium Stearate by Sankyo Yuki-Gosei K.K.). As in Example 1, a composition was prepared from the blend and formed into a film with a gage of 250 μm. The film was tested for MFR, tensile properties, heat sealability, and gas permeability, with the results shown in Tables 1 and 2.

TABLE 1

| | | Tensile properties (MD/TD) | | | |
|---|---|---|---|---|---|
| Example | Film MFR (g/10 min.) | Yield stress (kg/cm$^2$) | Rupture strength (kg/cm$^2$) | Initial modulus (kg/cm$^2$) | Elongation at rupture (%) |
| E1 | 40 | —/— | 290/260 | 1500/820 | 530/410 |
| E2 | 45 | —/— | 320/280 | 1400/880 | 590/470 |
| E3 | 35 | —/— | 280/240 | 1500/860 | 500/420 |
| E4 | 40 | —/— | 270/140 | 900/450 | 560/410 |
| CE1 | 25 | 210/200 | 310/300 | 9000/9000 | 250/350 |
| CE2 | 30 | 140/130 | 400/380 | 5000/4000 | 450/500 |

Note that "—/—" indicates that the specimen showed no definite values of yield stress.

TABLE 2

| | Coefficient of oxygen permeation (cc · mm/ m$^2$ · 24 hr · atm) | Heat seal strength (kg/15 mm) Seal bar temperature | | |
|---|---|---|---|---|
| Example | | 280° C. | 285° C. | 290° C. |
| E1 | 1100 | 4.4 | 4.6 | 4.5 |
| E2 | 1000 | 5.5 | 5.7 | 5.4 |
| E3 | 1000 | 4.3 | 4.5 | 4.2 |
| E4 | 830 | 4.4 | 4.5 | 4.1 |
| CE1 | 1800 | 2.3 | 2.5 | 2.1 |
| CE2 | 450 | 4.5 | 5.1 | 4.1 |

Although some preferred embodiments have been described, many modifications and variations may be made thereto in the light of the above teachings. It is therefore to be understood that within the scope of the appended claims, the invention may be practiced otherwise than as specifically described.

We claim:

1. A 4-methyl-1-pentene polymer composition comprising
   (A) 20 to 80 parts by weight of a 4-methyl-1-pentene polymer,
   (B) 80 to 20 parts by weight of a 1-butene polymer, the amount of (A) and (B) combined being 100 parts by weight,
   (C) 10 to 150 parts by weight of a propylene polymer, and
   (D) 50 to 200 parts by weight of a triblock copolymer of polystyrene/ethylene-butylene copolymer/polystyrene and/or a triblock copolymer of polystyrene/ethylenepropylene copolymer/polystyrene,
   the components being melt mixed to form the composition.

2. The composition of claim 1 wherein (A) 4-methyl-1-pentene polymer is a random copolymer consisting of 4-methyl-1-pentene and an alpha-olefin having 2 to 20 carbon atoms and containing at least 80% by weight of 4-methyl-1-pentene.

3. The composition of claim 1 wherein (A) 4-methyl-1-pentene polymer is a random copolymer consisting of 4-methyl-1-pentene and at least one monomer selected from 1-decene, 1-dodecene, 1-tetradecene, 1-hexadecene, and 1-octadecene.

4. The composition of claim 1 wherein (B) 1-butene polymer is a random copolymer consisting of 1-butene and an alpha-olefin having 2 to 20 carbon atoms and containing at least 60% by weight of 1-butene.

5. The composition of claim 1 wherein (B) 1-butene polymer is a random copolymer consisting of 1-butene and ethylene and/or propylene.

6. The composition of claim 1 wherein (C) propylene polymer is a random copolymer consisting of propylene and an alpha-olefin having 2 to 20 carbon atoms and containing at least 60% by weight of propylene.

7. The composition of claim 1 therein (C) propylene polymer is a random copolymer consisting of a propylene polymer and ethylene or butene-1.

8. The composition of claim 1 wherein (D) triblock copolymer of polystyrene/ethylene-butylene copolymer/polystyrene has a weight ratio of styrene/rubber component in the range of from 10/90 to 60/40.

9. The composition of claim 1 wherein (D) triblock copolymer of polystyrene/ethylene-propylene copolymer/polystyrene has a weight ratio of styrene/rubber component in the range of from 10/90 to 60/40.

10. The composition of claim 1 wherein the (A) 4-methyl-1-pentene polymer has a melt flow rate (MFR) of 0.1 to 150 g/10 min.

11. The composition of claim 1 wherein the (B) 1-butene polymer has a melt flow rate (MFR) of 0.01 to 100 g/10 min.

12. The composition of claim 1 wherein the (C) propylene polymer has a melt flow rate (MFR) of 0.01 to 100 g/10 min.

13. The composition of claim 1 wherein the (D) triblock copolymer has a melt flow rate (MFR) of 0.01 to 100 g/10 min.

14. The composition of claim 1 wherein (A) 4-methyl-1-pentene is blended with (B) 1-butene polymer in the amount of 40 to 60 parts by weight of (A) and 60 to 40 parts by weight of (B).

15. The composition of claim 1 wherein the amount of (C) propylene polymer is 40 to 100 parts by weight of (C) relative to 100 parts by weight of (A) and (B) combined.

16. The composition of claim 1, wherein the amount of (D) triblock copolymer is 70 to 120 parts by weight of (D) relative to 100 parts by weight of (A) and (B) combined.

17. The composition of claim 1 wherein (A) 4-methyl-1-pentene polymer is a random copolymer consisting of 4-methyl-1-pentene and a monomer of 1-eicosene.

* * * * *